United States Patent [19]

Tisol

[11] Patent Number: 5,363,539
[45] Date of Patent: Nov. 15, 1994

[54] FLEXIBLE TUBE CLIP

[75] Inventor: James S. Tisol, New Auburn, Wis.

[73] Assignee: Illinois Tool Works Inc., Glenview, Ill.

[21] Appl. No.: 14,498

[22] Filed: Feb. 8, 1993

[51] Int. Cl.⁵ .............................................. A44B 21/00
[52] U.S. Cl. ........................................ 24/543; 24/339
[58] Field of Search ................. 248/74.1, 74.2, 74.4, 248/68.1; 24/335, 336, 339, 543, 487

[56] References Cited

U.S. PATENT DOCUMENTS 4,203,180 5/1980 Striplin .
4,244,544 1/1981 Kornat ........................ 248/74.2 X
4,669,156 6/1987 Guido et al. ........................ 24/336
4,870,722 10/1989 Shell, Jr. ........................ 248/74.1 X
5,115,542 5/1992 Gehres .

Primary Examiner—James R. Brittain
Attorney, Agent, or Firm—Schwartz & Weinrieb

[57] ABSTRACT

A tube clip for mounting a plurality of tubular elements thereto includes a base member having a plurality of channels on one side thereof, each channel being substantially parallel to each other and open on a top surface thereof for receiving a tubular element within each of the channels and flexing structure for enabling independent movement between the channels of the base member.

15 Claims, 1 Drawing Sheet

FLEXIBLE TUBE CLIP

BACKGROUND OF THE INVENTION

1. Field of the Invention

This invention relates generally to tube clips, and more particularly to a tube clip, wiring harness or the like which is utilized to attach a plurality of tubular elements to another article and is flexible to allow independent movement between the tubular elements attached thereto during assembly and use as well as during future disassembly and re-assembly.

2. Description of the Related Art

Tube or hose clips typically include one or more channels which receive the tubular elements therein. The clip and tubular elements usually are to be attached to another article, such as a frame or other structure of an automobile, appliance or the like.

An example of such a clip is illustrated in U.S. Pat. No. 5,115,542 which discloses a hose separator clip having two clip halves which include arcuate areas separated by flats for engaging hoses therein. The clip halves are connected on a first end by a hinge and are closed at a second opposite end by a latch.

Such a hose clip, however, is typical utilized to keep tubular elements from contacting each other. Accordingly, such a hose clip does not provide for connection of the clip to another article. Furthermore, that hose clip does not provide any flexibility between adjacent channels.

Flexibility between the channels is desirable for ease of initial mounting of the tubular elements to the tube clip as well as during use, future disassembly and re-assembly. Such flexibility between channels would enable a first tubular element to be engaged within a first channel and connection of one or more additional tubular elements even if the additional tubular elements are slightly out of position. Additionally, the first connected tubular element could be slightly displaced away from a second element to enable the second element to be more easily attached.

For example, during automobile assembly, tubular elements such as fuel lines, wiring and the like are typically routed along the frame member and are secured at intervals along their lengths to the frame. During assembly, however, the tubular elements are frequently slightly out of position. If a non-flexible clip is utilized, it can be difficult to assemble that element to the clip without damaging or distorting the clip and/or the tubular element. Deformation of the tubular element is especially a problem if it conveys a fluid, such as a fuel line, or is made of metal which would not retain its original shape after being distorted.

Additionally, when an automobile or the like is serviced, it is frequently difficult to realign the tubular elements as they were assembled at the factory. Accordingly, a flexible tube clip would provide some "play" between the tubular elements, making them easier to detach and reconnect to the clip.

It is therefore desirable to provide a tube clip for attaching a plurality of tubular elements thereto where the tube clip is flexible so as to allow movement between the attached tubular elements during assembly, use, disassembly and re-assembly.

SUMMARY OF THE INVENTION

The invention provides a tube clip for mounting a plurality of tubular elements thereto and which preferably can be connected to another article to secure the tubular elements in a desired position. The clip includes a base member having a plurality of channels on one side thereof, each channel being substantially parallel to each other and open on a top surface thereof for receiving a tubular element within each of the channels. The base member also includes structure for enabling independent flexing of each channel so as to assist in assembly of the tubular elements to the clip and to enable some flexing of the tubular elements during use and possible disassembly and re-assembly.

To assist in maintaining a tubular element in its respective channel, each channel can be formed to releasably hold a tubular element therein. Additionally, the clip can include a top cover member for cooperative engagement with the channels where a first end of the top cover member is hingedly connected to a first end of the base member and a latch is included to releasably connect a second opposite end of the top cover member to a second opposite end of the base member. If desired, the top cover member can be formed with its own channel members for cooperative engagement with the channels of the base member, each channel member of the top cover member being flexible, similar to the channels of the base member.

BRIEF DESCRIPTION OF THE DRAWINGS

Various other objects, features, and attendant advantages of the invention will be more fully appreciated from the following detailed description, when considered in connection with the accompanying drawings, in which like reference characters designate like or corresponding parts throughout the several views, and wherein.

DESCRIPTION OF THE PREFERRED EMBODIMENT

Figure 1:
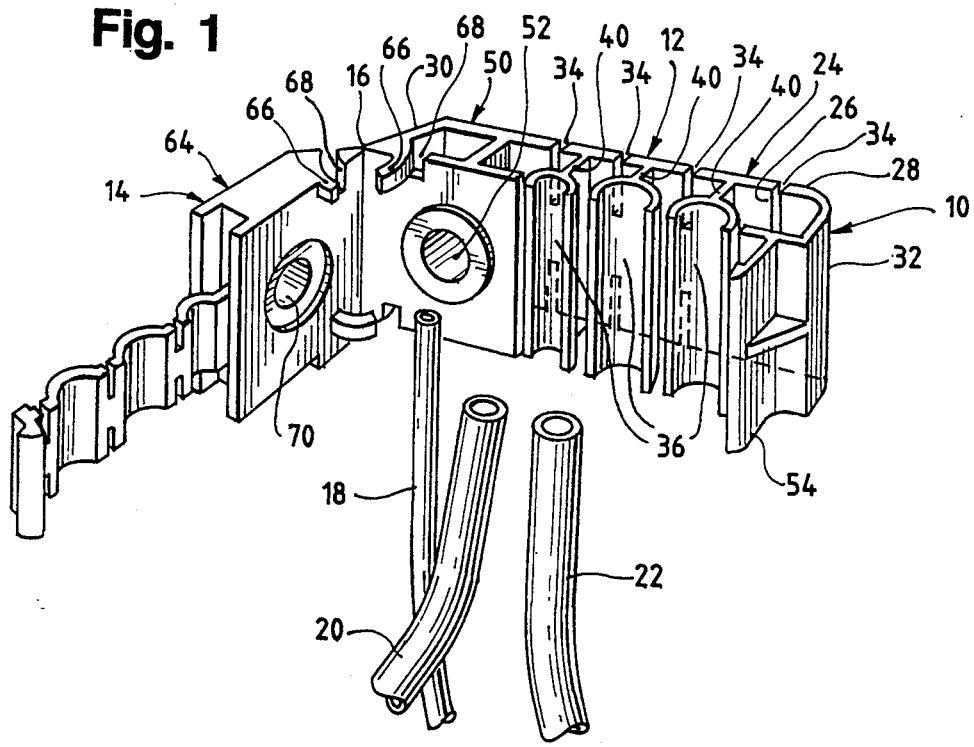
FIG. 1 is a perspective view of the tube clip of the invention in its open position and illustrated with a plurality of tubular elements being inserted therein.

Referring to FIG. 1, the tube clip of the invention is generally designated by the reference numeral 10. The clip 10 includes a base member 12 and a top cover member 14 which are connected by a hinge member 16. The clip 10 is preferably integrally formed in one piece from plastic, but the number of components and material can vary.

Typically, the clip 10 is utilized for releasably connecting a plurality of tubular elements 18, 20 and 22 therein. Although the tubular elements 18–22 are illustrated as tubes or hoses, it is to be understood that the tubular elements 18–22 can be any type of tubular member including a rod, wiring or the like.

Briefly, in use, each tubular element 18–22 is preferably individually inserted one-by-one into engagement with the base member 12, structural details of which will be provided herein. If desired, as each tubular element 18–22 is inserted it can be releasably retained within the base member 12 so as to enable ease of handling a subsequent element. The top cover member 14 is then rotated about the hinge 16 and secured with a latch as described below. The tubular elements 18-22 are retained within the clip 10 which can then be connected to another object, if desired.

As FIG. 1 illustrates, the base member 12 includes a first bottom side 24 which is substantially rectangular in shape including an inside surface 26, outside surface 28 and first and second opposite ends 30 and 32. In order to provide flexibility to the bottom side 24, a plurality of laterally spaced, longitudinally extending slots 34 are included.

Preferably, the slots 34 extend through the bottom side 24 from an exterior edge of the bottom side 24 to a position proximate the transverse center line of the bottom side 24. Thus, the slots 34 do not extend completely across the bottom side 24, leaving a center support ridge 36 between opposite slots 34. Although eight slots 34 are illustrated, four each along a respective edge of the bottom side 24, the number as well as the width and length of the slots 34 can vary.

Figure 2:
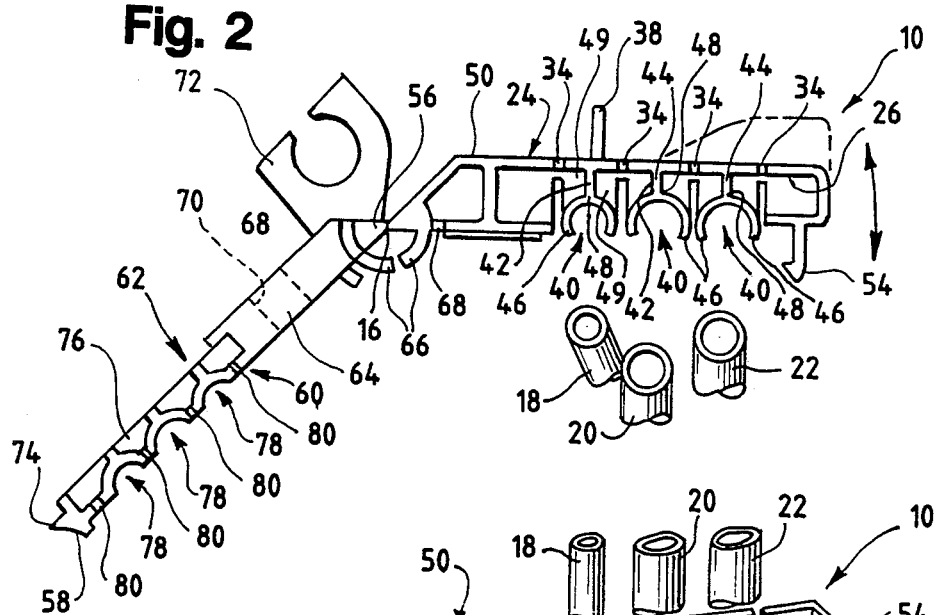
FIG. 2 is a top plan view of the tube clip of FIG. 1 and illustrating a twisted position of the tube clip in dotted outline.

As FIG. 2 illustrates, in order to locate or connect the clip 10 to another object, the outside surface 28 can include a pin 38. If desired, the pin 38 can be formed as any type of fastener to be secured to another object.

In order to seat and/or attach the tubular elements 18-22 within the clip 10, the inside surface 26 of the bottom side 24 includes a plurality of channel members 40 upstanding therefrom. Each channel member 40 includes a stem 42 having a first proximal end 44 which is preferably integrally formed with the inside surface 26 and a semicircular head portion 46 formed on an opposite distal end 48 of the stem 42.

Accordingly, the channel members 40 are free standing and move independently of each other since they are only connected to the bottom side 24 by their respective stems 42. In order to provide increased support to the channel members 40, central support struts 49 can be included along each side of a respective stem 42 extending between the head portions 46 and the inside surface 26. The number and shape of the channel members 40 can vary.

To provide gripping of the tubular elements 18-22 within the channel members 40, each channel member 40 can be formed with head portions 46 which extend slightly greater than 180 degrees. Thus, each tubular element 18-22 can be snapped into its respective channel member 40 and held therein until the top cover member 14 is engaged with the base member 12.

As FIG. 1 illustrates, the first end 30 of the bottom side 24 is formed with a rectangular box 50 having an aperture 52 therethrough for mounting the clip 10 to another article as described herein. The second end 32 of the bottom side 24 includes a latch member 54.

As FIG. 2 illustrates, the top cover member 14 includes first and second opposite ends 56 and 58, a first inside surface 60 and a second outside surface 62. The first end 56 is formed as a rectangular box 64, similar to the box 50 of the base member 12, with the hinge 16 extending between the two box portions 50 and 64. To align the top cover member 14 with the base member 12 as the clip 10 is closed, a curved pin 66 and corresponding alignment channel 68 can be included, one each on the base member 12 and the top cover member 14 as illustrated.

The box 64 includes an aperture 70 therethrough for alignment with the aperture 52 of the base member 12 when the clip 10 is closed. If desired, an additional outside clip 72 can be formed with the box 64.

The outside surface 62 of the top cover member 14 extends away from the box 64 to the second end 58 and terminates with a latch portion 74 for engagement with the latch 54 of the base member 12. The outside surface 62 is substantially formed with a central spine 76 having a plurality of arcuate portions 78 formed therewith.

The arcuate portions 78 define the inside surface 60 of the top cover member 14 and are positioned for cooperative alignment and engagement with a respective channel member 40. To provide flexibility between the arcuate portions 78, slots 80 are included through the top cover member 14 extending from an outside edge thereof and terminating a slight distance into the top cover member 14.

In use, the clip 10 is provided in its open position as illustrated in FIGS. 1 and 2. A first tubular element 18 is inserted into a desired channel member 40. Next, a second tubular element 20 is inserted into another channel member 40. To assist in insertion of the second tubular element 20, the base portion 12 can be twisted virtually in any direction as illustrated in dotted outline in FIG. 2. Additionally, any of the channel members 40 can be displaced, either in tandem or independently of each other, to accommodate any variances in position of the tubular elements 18-22 and assist in insertion of a subsequent tubular element.

Figure 3:
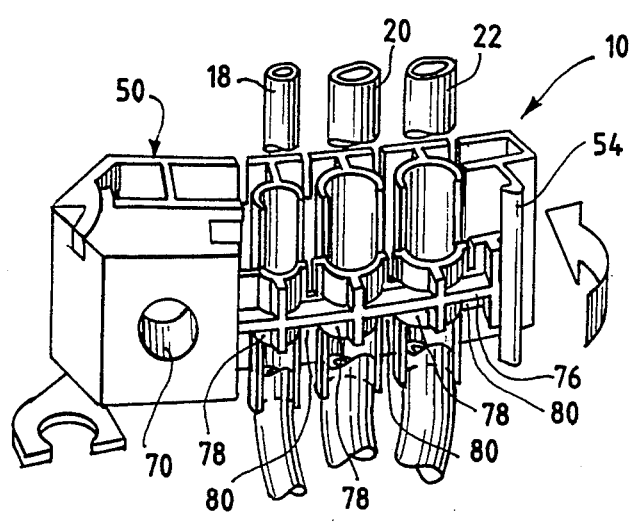
FIG. 3 is a perspective view of the tube clip of the invention in its closed position with a plurality of tubular elements connected thereto and slightly bent into an arcuate position.

Thereafter, the last tubular element 22 is inserted, the top cover member 14 is rotated about the hinge 16 and the latch members 54 and 74 are engaged to retain the clip 10 in the closed position as illustrated in FIG. 3. If desired, the clip 10, can then be connected to another article by either inserting a fastener (not illustrated) through the aligned apertures 52 and 70 and securing the fastener to the article or by providing the pin 38 in the form of a fastener.

In any event, the clip 10 provides flexibility between the channel members 40 in virtually any direction. This enables the channel members 40 to be opened up and the tubular elements 18-22 inserted with relative ease. It is to be noted that the order in which the tubular elements 18-22 are inserted can vary and the clip 10 can be first connected to the desired article and the tubular elements 18-22 inserted therein.

Modifications and variations of the present invention are possible in light of the above teachings. It therefore is to be understood that within the scope of the appended claims, the invention may be practiced otherwise than as specifically described.

What is claimed and desired to be secured by Letters Patent is:

1. A tube clip for mounting a plurality of tubular elements thereto, comprising:

a base member having oppositely disposed edge portions;

a plurality of substantially C-shaped channel members, having a substantially closed rear portion and an open front portion for receiving a tubular element therein, fixedly mounted upon one side of said base member at said substantially closed rear portions such that longitudinal axes of said substantially C-shaped channel members are substantially parallel to each other and front edge portions of each one of said substantially C-shaped channel members are separated from adjacent front edge portions of adjacent substantially C-shaped channel members; and longitudinally extending slot means defined within said base member and extending toward a longitudinally central portion of said base member from said oppositely disposed edge portions of said base member so as to divide said base member into a plurality of base sections, which are separated from each other except at said longitudinally central portion of said base member and wherein said plurality of substantially C-shaped channel members are respectively disposed upon said plurality of separate base sections of said base member, for enabling independent movement of said plurality of base sections of said base member and said substantially C-shaped channel members disposed upon said plurality of base sections in order to facilitate mounting of a plurality of tubular elements within said plurality of substantially C-shaped channel members.

2. The clip as defined in claim 1 including means for releasably retaining a tubular element in a respective channel of said base member.

3. The clip as set forth in claim 2, wherein:
said releasably retaining means comprises said tube clip being fabricated from a plastic material; and
each one of said substantially C-shaped channel members has said open front portion thereof encompassing an angular extent of greater than 180°.

4. The clip as defined in claim 1 including a top cover member for cooperative engagement with said plurality of channels of said base member, hinge means for hingedly connecting a first end of said base member to a first end of said top cover member and latch means for releasably connecting a second opposite end of said base member to a second opposite end of said top cover member.

5. The clip as set forth in claim 4, further comprising:
an arcuate pin and an arcuate channel defined within each one of said base and top cover members for cooperating with each other during hinged movement of said base and top cover members with respect to each other.

6. The clip as defined in claim 4 wherein said top cover member includes a plurality of channel members, one each for cooperative engagement with said open front portion of a respective channel of said base member.

7. The clip as set forth in claim 6, further comprising:
a central support spine located at longitudinally central portions of said plurality of channel members of said cover member for providing increased support to said channel members of said cover member at longitudinally central locations of said channel members of said cover member.

8. The clip as defined in claim 6 including top cover flexing means for enabling independent movement between said channel members of said top cover member.

9. The clip as set forth in claim 8, wherein:
said flexing means of said top cover member comprises a plurality of slot means extending from opposite edge portions of said top cover member.

10. The clip as defined in claim 1 wherein said slot means enable independent two dimensional movement between said channels of said base member.

11. The clip as defined in claim 1 wherein said slot means enable independent three dimensional movement between said channels of said base member.

12. The clip as defined in claim 1 including means for connecting said base member to another article.

13. The clip as set forth in claim 12, wherein:
said connecting means comprises a pin-type fastener.

14. The clip as set forth in claim 1, further comprising:
support struts provided at said longitudinally central portion of said base member and interposed between said adjacent C-shaped channel members for connecting said rear portions of said C-shaped channel members to said one side of said base member so as to provide increased support for said C-shaped channel members with respect to said base member.

15. The clip as set forth in claim 1, further comprising:
aperture means defined through said base member for receiving a fastener so as to secure said clip to another article.

* * * * *